(12) United States Patent
Zaric et al.

(10) Patent No.: US 9,953,008 B2
(45) Date of Patent: Apr. 24, 2018

(54) GROUPING FIXED FORMAT DOCUMENT ELEMENTS TO PRESERVE GRAPHICAL DATA SEMANTICS AFTER REFLOW BY MANIPULATING A BOUNDING BOX VERTICALLY AND HORIZONTALLY

(71) Applicant: MICROSOFT TECHNOLOGY LICENSING, LLC, Redmond, WA (US)

(72) Inventors: Drazen Zaric, Belgrade (RS); Milan Sesum, Belgrade (RS); Milos Lazarevic, Nis (RS); Aljosa Obuljen, New Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 283 days.

(21) Appl. No.: 13/745,279

(22) Filed: Jan. 18, 2013

(65) Prior Publication Data

US 2014/0208191 A1     Jul. 24, 2014

(51) Int. Cl.
*H03M 7/30* (2006.01)
*H04N 1/393* (2006.01)
(Continued)

(52) U.S. Cl.
CPC .......... *G06F 17/211* (2013.01); *G06F 17/21* (2013.01); *G06F 17/2229* (2013.01); *G06K 15/1814* (2013.01); *G06F 17/212* (2013.01)

(58) Field of Classification Search
CPC ... G06F 17/24; G06F 17/211; G06F 17/30017
(Continued)

(56) References Cited

U.S. PATENT DOCUMENTS 4,503,515 A    3/1985 Cuan et al.
4,648,067 A    3/1987 Repass et al.
(Continued)

FOREIGN PATENT DOCUMENTS

CN    1609846 A    4/2005
CN    101375278 A    2/2009
(Continued)

OTHER PUBLICATIONS

Schrier, et al., "Adaptive Layout for Dynamically Aggregated Documents", In Proceedings of 13th International Conference on Intelligent User Interlaces, Jan. 13, 2008, 10 pages.
(Continued)

*Primary Examiner* — Cesar B Paula
*Assistant Examiner* — Luu-Phuong T Nguyen
(74) *Attorney, Agent, or Firm* — Merchant & Gould P.C.

(57) ABSTRACT

Determining relationships between graphical elements in a fixed format document is provided. Graphical element sizes and their relative positions may be analyzed to determine whether two or more graphical elements should be aggregated together or whether the graphical elements should belong to different graphical groups. Graphs and figures comprising objects that are absolutely positioned may be detected, as well as objects where inter-element positions need to be preserved from regular document flow. Additionally, background objects may be differentiated from regular text flow when the objects overlap with text.

17 Claims, 11 Drawing Sheets

(51) Int. Cl.
 *G06F 17/21* (2006.01)
 *G06F 17/22* (2006.01)
 *G06K 15/02* (2006.01)

(58) Field of Classification Search
 USPC .................................................. 715/201
 See application file for complete search history.

(56) References Cited

U.S. PATENT DOCUMENTS

| | | | |
|---|---|---|---|
| 5,111,397 A | 5/1992 | Chirokas et al. | |
| 5,574,802 A | 11/1996 | Ozaki | |
| 5,737,442 A | 4/1998 | Alam et al. | |
| 5,784,487 A | 7/1998 | Cooperman | |
| 5,870,767 A | 2/1999 | Kraft, IV | |
| 6,115,497 A | 9/2000 | Vaezi et al. | |
| 6,173,073 B1 | 1/2001 | Wang | |
| 6,289,121 B1 | 9/2001 | Abe et al. | |
| 6,336,124 B1 | 1/2002 | Alam et al. | |
| 6,360,011 B1 | 3/2002 | Katsumata et al. | |
| 6,377,704 B1 | 4/2002 | Cooperman | |
| 6,493,694 B1 | 12/2002 | Xu et al. | |
| 6,915,484 B1 | 7/2005 | Ayers et al. | |
| 7,027,071 B2 | 4/2006 | Chao | |
| 7,307,642 B2 | 12/2007 | Sack et al. | |
| 7,418,652 B2 | 8/2008 | Ornstein et al. | |
| 7,644,356 B2 | 1/2010 | Atkins et al. | |
| 7,676,741 B2 | 3/2010 | McGatha et al. | |
| 7,715,635 B1* | 5/2010 | Shagam et al. | 382/225 |
| 7,788,580 B1* | 8/2010 | Goodwin | G06F 17/211 715/243 |
| 8,014,013 B2 | 9/2011 | Owen et al. | |
| 8,023,738 B1* | 9/2011 | Goodwin et al. | 382/175 |
| 8,023,740 B2 | 9/2011 | Djean | |
| 8,024,648 B2 | 9/2011 | Foehr et al. | |
| 8,200,009 B2 | 6/2012 | Lin | |
| 8,249,356 B1 | 8/2012 | Smith | |
| 8,254,681 B1 | 8/2012 | Poncin et al. | |
| 8,276,090 B2 | 9/2012 | Chen et al. | |
| 8,443,278 B2 | 5/2013 | Mansfield et al. | |
| 8,718,364 B2 | 5/2014 | Enomoto | |
| 8,942,489 B2 | 1/2015 | Sesum et al. | |
| 9,042,653 B2 | 5/2015 | Lin et al. | |
| 9,081,412 B2 | 7/2015 | Kompalli et al. | |
| 9,251,413 B2 | 2/2016 | Meier et al. | |
| 9,703,759 B2 | 7/2017 | Zaric et al. | |
| 2002/0004713 A1 | 1/2002 | Wakabayashi et al. | |
| 2002/0073035 A1 | 6/2002 | Saito | |
| 2002/0181779 A1 | 12/2002 | Hansen | |
| 2003/0167271 A1 | 9/2003 | Arnold et al. | |
| 2004/0093355 A1 | 5/2004 | Stinger | |
| 2004/0146199 A1* | 7/2004 | Berkner | G06F 17/30905 382/176 |
| 2004/0205568 A1* | 10/2004 | Breuel et al. | 715/513 |
| 2004/0205681 A1 | 10/2004 | Nozuyama | |
| 2004/0240735 A1 | 12/2004 | Medina | |
| 2005/0188303 A1* | 8/2005 | Ayers | G06F 17/212 715/244 |
| 2006/0147117 A1* | 7/2006 | Wakeam | G06K 9/00402 382/186 |
| 2006/0242166 A1 | 10/2006 | Larcheveque et al. | |
| 2006/0288278 A1 | 12/2006 | Kobayashii | |
| 2007/0035780 A1 | 2/2007 | Kanno | |
| 2007/0079236 A1* | 4/2007 | Schrier | G06F 17/217 715/206 |
| 2007/0174761 A1 | 7/2007 | Lin et al. | |
| 2007/0177183 A1 | 8/2007 | Robinson et al. | |
| 2007/0234203 A1* | 10/2007 | Shagam | G06F 17/211 715/210 |
| 2007/0237428 A1* | 10/2007 | Goodwin | G06K 9/00442 382/309 |
| 2008/0123945 A1 | 5/2008 | Andrew et al. | |
| 2009/0110288 A1 | 4/2009 | Fujiwara | |
| 2009/0119578 A1 | 5/2009 | Relyea et al. | |
| 2009/0144614 A1 | 6/2009 | Dresevic et al. | |
| 2010/0174732 A1 | 7/2010 | Levy et al. | |
| 2010/0211866 A1* | 8/2010 | Nicholas et al. | 715/234 |
| 2010/0254604 A1 | 10/2010 | Prabhakara et al. | |
| 2010/0306260 A1 | 12/2010 | Dejean | |
| 2011/0289395 A1 | 11/2011 | Breuel et al. | |
| 2012/0039536 A1 | 2/2012 | Djean et al. | |
| 2012/0096345 A1* | 4/2012 | Ho | G06F 3/017 715/252 |
| 2012/0102388 A1* | 4/2012 | Fan | G06F 17/2264 715/234 |
| 2012/0128249 A1* | 5/2012 | Panjwani | G06K 9/00469 382/177 |
| 2012/0311426 A1 | 12/2012 | Desai et al. | |
| 2012/0317470 A1 | 12/2012 | Djean | |
| 2012/0324341 A1 | 12/2012 | Djean | |
| 2013/0067313 A1 | 3/2013 | Leguin et al. | |
| 2013/0191715 A1 | 7/2013 | Raskovic et al. | |
| 2013/0191732 A1 | 7/2013 | Lazarevic et al. | |
| 2013/0198599 A1 | 8/2013 | Kumar et al. | |
| 2013/0223743 A1 | 8/2013 | Deryagin et al. | |
| 2014/0108897 A1* | 4/2014 | Boutelle et al. | 715/201 |
| 2015/0135047 A1 | 5/2015 | Sesum et al. | |
| 2016/0371244 A1 | 12/2016 | Chakra et al. | |

FOREIGN PATENT DOCUMENTS

| | | | |
|---|---|---|---|
| CN | 102105862 A | | 6/2011 |
| CN | 102301377 A | | 12/2011 |
| EP | 0779593 A2 | | 6/1997 |
| EP | 1635268 A2 | | 3/2006 |
| EP | 2343670 A2 | | 7/2011 |
| JP | S63304387 A | | 12/1988 |
| JP | H08185476 A | | 7/1996 |
| JP | H09171556 A | | 6/1997 |
| JP | 2000105836 A | | 4/2000 |

OTHER PUBLICATIONS

"ABBYY Fine Reader, Verision 12, User's Guide", https://www.abbyy.com/media/4712/guide_english.pdf, 2013, 116 pages.

"ABBYY FineReader 9.0 Sprint", http://www.abbyy.com/finereader/sprint-9/faq, Feb. 19, 2016, 8 pages.

"Can you convert a PDF table with Row and Column structure retaining in Excel?", http://www.a-pdf.com/faq/can-you-convert-a-pdf-table-with-row-and-column-structure-retaining-in-excel.htm, Jan. 14, 2014, 1 page.

"Chapter 16: Footnotes", http://www.sagehill.net/docbookxsl/Footnotes.html, Nov. 20, 2012, 2 pages.

"Convert Scanned PDF to Word", http://www.onlineocr.net, Jun. 6, 2014, 1 page.

"Convert PDF and JPG Files to Microsoft Word and Excel", https://finereaderonline.com/en-us, Jun. 23, 2014, 2 pages.

"Footnotes and Endnotes", http://word.tips.net/C0066_Footnotes_and_Endnotes.html, Nov. 20, 2012, 6 pages.

"Introduction to Optical Character Recognition Software", http://www.simpleocr.com/OCR_software_guide, Aug. 18, 2015, 17 pages.

"OCR to Excel", http://www.simpleocr.com/OCT_to_Excel, Aug. 20, 2015, 7 pages.

Baird, "Anatomy of a Versatile Page Reader", Proceedings in the IEEE, IEEE, New York, Jul. 1, 1992, 8 pages.

Borstein, "Exporting a PDF to Excel", http://blogs.adobe.com/acrolaw/2009/04/exporting-a-pdf-to-excel, Apr. 7, 2009, 3 pages.

Cesarini et al., "Structured Document Segmentation and Representation by the Modified X-Y-tree", Proceedings of the Fifth International Conference on Document Analysis and Recognition, ICDAR 99, pp. 563-566.

Cesarini et al., "Trainable table location in document images," Pattern Recognition, Proceedings, 16th International Conference on Quebec City, Aug. 11, 2002, 6 pages.

Chao et al., "Layout and Content Extraction for PDF Documents", Computer Science, vol. 3163, Springer, Verlag Berlin & Heidelberg, Jan. 1, 2004, 12 pages.

(56) References Cited

OTHER PUBLICATIONS

Douglas et al., "Using Natural Language Processing for Identifying and Interpreting Tables in Plain Text", Fourth Annual Symposium on Document Analysis and Information Retrieval, Apr. 1, 1995, 15 pages.

Duygulu et al., "A hierarchical representation of form documents for identification and retrieval", International Journal on Document Analysis and Recognition, vol. 5, 2002, pp. 17-27.

Embley et al., "Table-processing Paradigms: a Research Survey", In International Journal of Document Analysis, May 9, 2006, 21 pages.

Fang et al., "A Table Detection Method for Multipage PDF Documents via Visual Separators and Tabular Structures", In Proceedings of International Conference on Document Analysis and Recognition, Sep. 18, 2011, 5 pages.

Glushko "Design Issues for Multi-Document Hypertexts", In Proceedings of Hypertext, http://couses.ischool.berkley.edu/i290-f/s02/readings/glushko_multidocs.pdf, Nov. 1989, 10 pages.

Golovchinsky et al., "Moving Markup: Repositioning Freeform Annotations", In: Proceedings of the 15th Annual ACM Symposium on User Interface Software and Technology, Paris, France, Oct. 27, 2002, 9 pages.

Hirano et al., "Text and Layout Information Extraction from Document Files of Various Formats Based on the Analysis of Page Description Language", In: Proceedings of Ninth International Conference on Document Analysis and Recognition, Sep. 23, 2007, 5 pages.

Hirayama, "A Block Segmentation Method for Document Images with Complicated Column Structures", IEICE, Nov. 25, 1996, 11 pages.

Itonori, "Table Structure Recognition based on Textblock Arrangement and Ruled Line Position", In Proceedings of the Second International Conference on Document Analysis and Recognition, Oct. 20, 1993, 4 pages.

Liang et al., "Document Layout Structure Extraction Using Bounding Boxes of Different Entities", Proceedings of the 3rd IEEE Workshop on Applications of Computer Vision, WACV, 1996, pp. 278-283.

Lin et al., "Mathematical Formula Identification in PDF Documents", International Conference on Document Analysis and Recognition, IEEE, 2011, pp. 1419-1423.

Liu et al., "A Fast Preprocessing Method for Table Boundary Detection: Narrowing Down the Sparse Lines using Solely Coordinate Information", In Proceedings of the Eighth IAPR International Workshop on Document Analysis Systems, Sep. 16, 2008, 8 pages.

Malleron et al., "Text Lines and Snippets Extraction for 19th Century Handwriting Documents Layout Analysis", In: Proceedings of 10th International Conference on Document Analysis and Recognition, Jul. 26, 2009, pp. 1001-1005.

Mini Image to Excel Table OCR Converter, http://www.minipdf.com/scan-to-excel/image-to-excel-table.html, Oct. 3, 2011, 3 pages.

Nagy et al., "A Prototype Document Image Analysis System for Technical Journals", Computer, vol. 25, No. 7, 1992, pp. 10-22.

Ramakrishnan et al., "Layout-Aware Text Extraction from Full-Text PDF of Scientific Articles", Source Code for Biology and Medicine, BioMed Central, UK, May 28, 2012, 21 pages.

Ramel et al., "Detection, Extraction and Representation of Tables", In Proceedings of Seventh International Conference on Document Analysis and Recognition, Aug. 3, 2003, 5 pages.

Silva et al., "Design of an end-to-end method to extract information from tables", International Journal of Document Analysis and Recognition, vol. 8, No. 2, Feb. 25, 2006, 28 pages.

Tersteegen et al., "Scantab: Table Recognition by Reference Tables", In Proceedings of Third IAPR Workshop on Document Analysis Systems, Nov. 4, 1998, 10 pages.

Wang, "Table Detection via Probability Optimization", Document Analysis Systems V, Jan. 1, 2002, 12 pages.

Xiong, "Research on SVG-based vector graphics editing systems", Apr. 8, 2004, 57 pages. (No English Translation).

E Silva et al., "Design of an end-to-end method to extract information from tables," International Journal of Document Analysis and Recognition (IJDAR), 8(2-3), pp. 144-171, 2006.

Evans et al., "Using the New Photo Merge Panorama and Photo Merge HDR Tools in Adobe Photoshop Lightroom CC (2015 release)" Adobe Press, Retrieved from the Internet: <URL: http://adobepress.com/articles/printerfriendly/2339642>, Apr. 24, 2015, 3 pages.

ReadirisTM Pro 12, User Guide, 2010, 73 pages.

Wikipedia, "Comparison of optical character recognition software," Retrieved from the Internet: <URL: https://en.wikipedia.org/wiki/Comparison_of_optical_character_recognition_software>, retreived on Jan. 12, 2018 [in U.S. Appl. No. 15/420,647, dated Jan. 25, 2018], 5 pages.

* cited by examiner

GROUPING FIXED FORMAT DOCUMENT ELEMENTS TO PRESERVE GRAPHICAL DATA SEMANTICS AFTER REFLOW BY MANIPULATING A BOUNDING BOX VERTICALLY AND HORIZONTALLY

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document may be converted into a flow format document. Conversion involves parsing the fixed format document and transforming the basic physical layout elements from the fixed format document into the more complex logical elements used in a flow format document.

Most often, fixed format documents do not contain information about document layout elements such as graphic aggregations of vector graphics elements. Vector graphics in a fixed format document may represent various types of elements such as, but not limited to, font effects (e.g., underline, strikethrough, double strikethrough, etc.), text run borders and shading, paragraph borders and shading, page borders, page color, table borders, graphics (e.g., arrows, shapes, callouts, function plots, etc.). For example, a vector graphics element in a fixed format document may be a font underline or alternatively, may be a table edge or part of an arrow. While these elements may be visible by a user using a fixed format document viewer, proper detection of semantics of vector graphics elements may not be as straightforward. When converting a fixed format document to a flow format document, a vector graphics element may need to be dissected to understand to which element each vector graphics element belongs.

While various converters of fixed format documents to flow format documents exist, such converters may not focus primarily on document reflow. Accordingly, such converters may lack advanced layout element reconstruction. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing detection and grouping of graphic elements while preserving remaining content in a document in a main document flow.

One embodiment defines a method for grouping graphical elements into a graphic aggregation when converting a fixed format document into a flow format document. A vector graphics classification engine may be utilized to define a first bounding box around a first graphical element and a second bounding box around a second graphical element, determine a shortest distance between the first and second graphical element bounding boxes, determine a join threshold; and if the shortest distance between the first and second graphical element bounding boxes is less than the determined join threshold, grouping the first graphical element and the second graphical element into a first graphic aggregation.

Another embodiment defines a vector graphics classification engine method for grouping graphical elements into a graphic aggregation by analyzing text lines and if more than a predefined overlap amount of a line of text is inside a bounding box of a graphic aggregation, grouping all graphical elements of the line of text into the graphic aggregation.

According to another embodiment, the vector graphics classification engine may be further operable to merge graphic aggregations if a bounding box of a first graphic aggregation and a bounding box of a second graphic aggregation intersect. Embodiments may also provide for performing a vertical and horizontal expansion of a graphic aggregation to include a text line if predefined conditions are satisfied.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
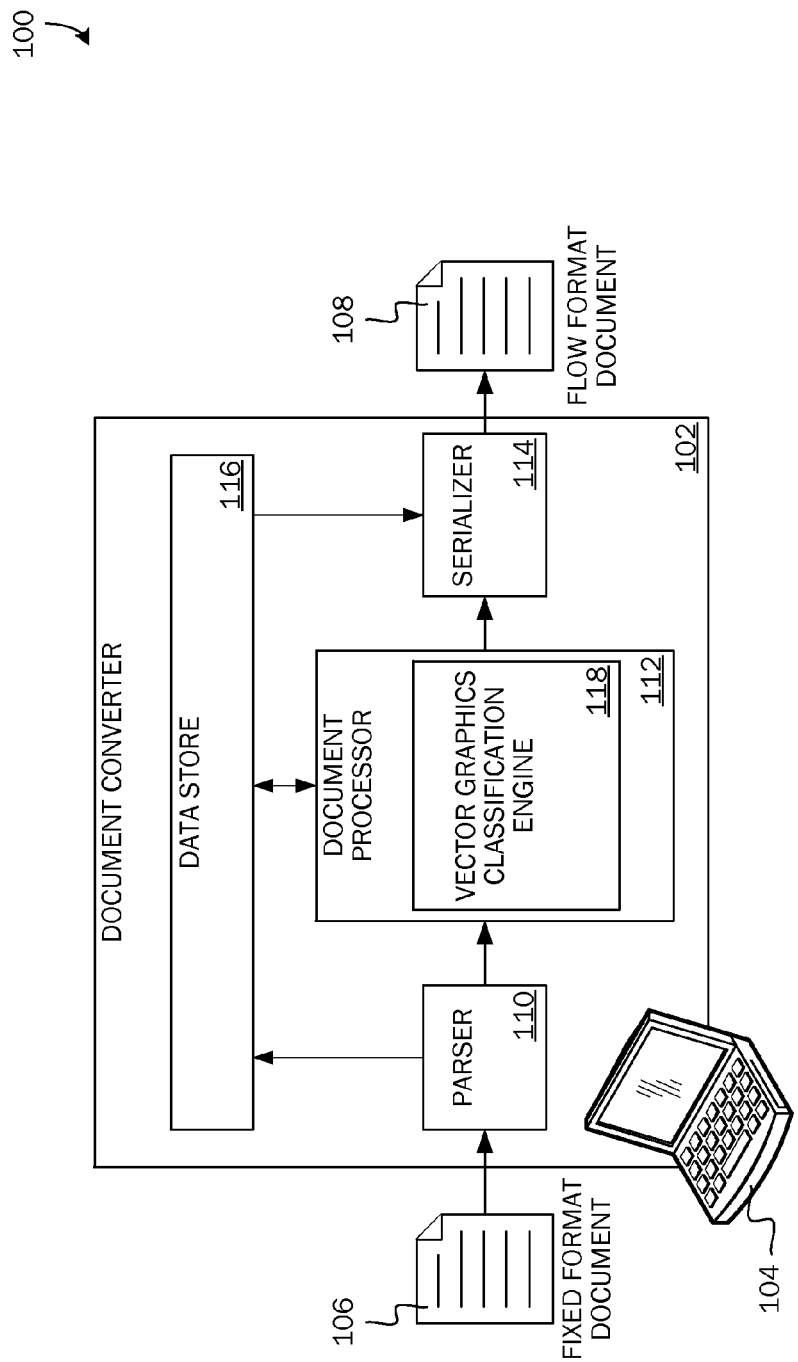
FIG. 1 is a block diagram of one embodiment of a system including a document converter.

As briefly described above, embodiments of the present invention are directed to providing detection and grouping of graphic elements while preserving remaining content in a document in a main document flow. According to embodiments, relationships between graphical elements in a fixed format document may be determined. Graphical element sizes and their relative positions may be analyzed to determine whether two or more graphical elements should be aggregated together or whether the graphical elements should belong to different graphical groups.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 illustrates one embodiment of a system 100 incorporating a vector graphics classification engine 118. In the illustrated embodiment, the vector graphics classification engine 118 operates as part of a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the vector graphics classification engine 118 of the present invention). Finally, the serializer 114 writes the flowable elements into a flowable document format (e.g., a word processing format) 108.

Figure 2:
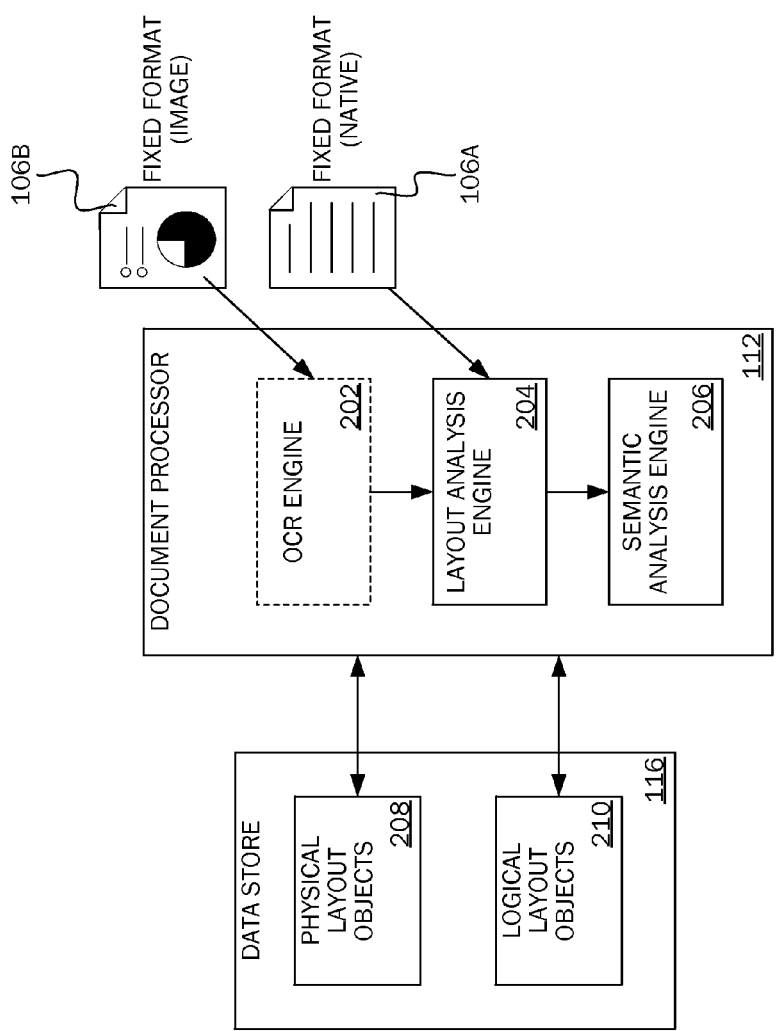
FIG. 2 is a block diagram showing an operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects 208 include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical layout objects 210 include flowable elements such as sections, paragraphs, columns, tables, and lists.

Where processing begins depends on the type of fixed format document 106 being parsed. A native fixed format document 106A created directly from a flow format source document contains some or all of the basic physical layout elements. The embedded data objects are extracted by the parser and are available for immediate use by the document converter; although, in some instances, minor reformatting or other minor processing is applied to organize or standardize the data. In contrast, all information in an image-based fixed format document 106B created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

As described briefly above, embodiments provide for detection and reconstruction of graphic aggregations. A graphic aggregation may comprise a set of absolutely positioned graphical elements that should be reflown together when a fixed format document 106 is converted to a flow format document 108. Relative positions of graphical elements within a graphic aggregation may be preserved in order to preserve semantics of the graphical group. A graphic aggregation may include, for example, a graph, a figure, a diagram, a chart, or other set of objects that may be absolutely positioned.

Figure 3:
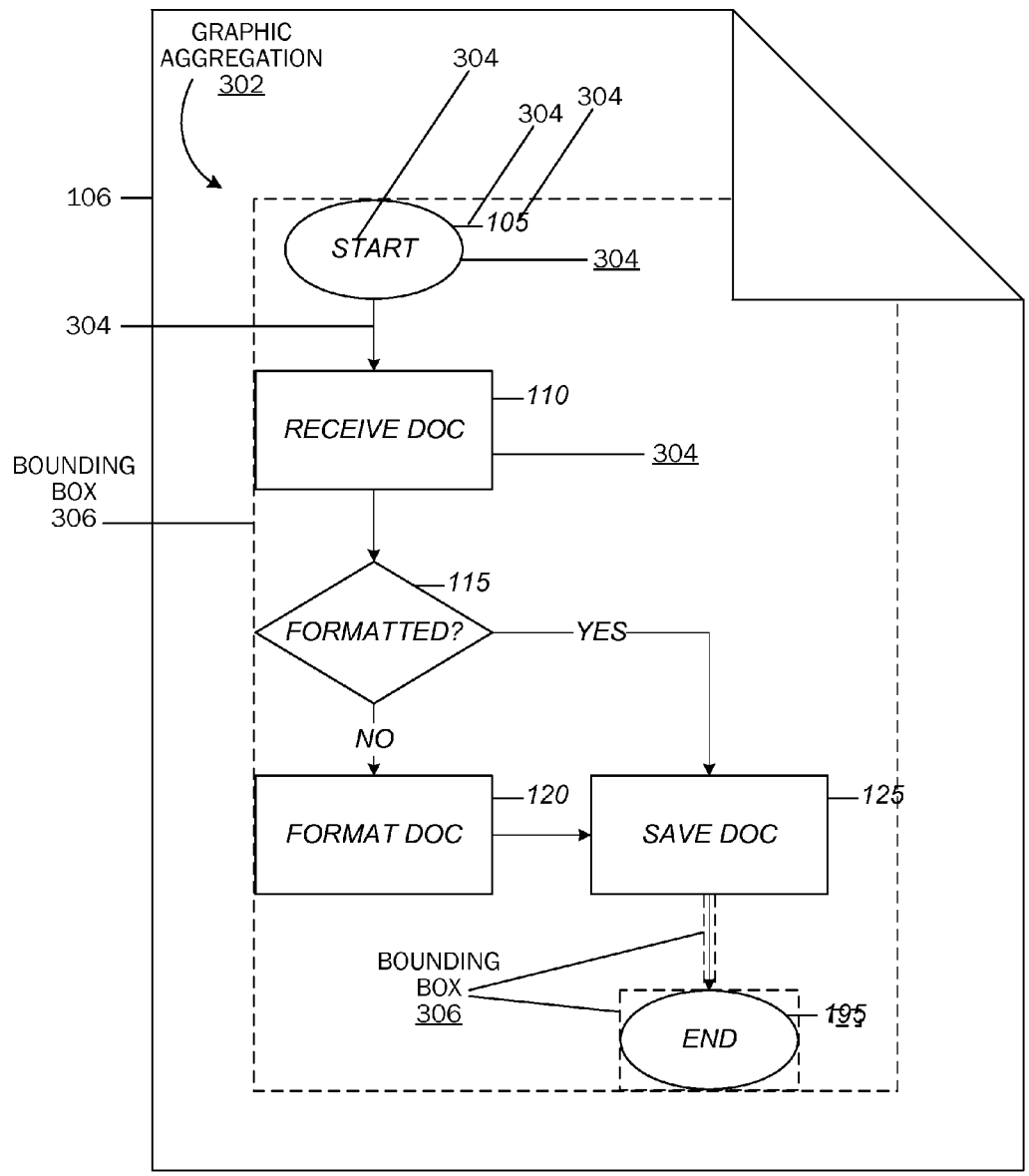
FIG. 3 is an illustration of an example graphic aggregation in a fixed format document.

With reference now to FIG. 3, an example graphic aggregation 302 in a fixed format document 106 is illustrated. In this example, the graphic aggregation 302 is a flow chart. A graphic aggregation 302 may comprise a number of graphical elements 304 (e.g., paths, images, and text). According to embodiments, explicit relationship information between graphical elements 304 may not be encoded in a fixed format document 106. Accordingly, when converting a fixed format document 106 to a reflowable document (flow format document 108), embodiments provide for discovering and reconstructing relationships between graphical elements 304. As a result, in case of reflow, all graphical elements 304 in a graphic aggregation 302 may be reflown together as a group. Remaining content in the document may be kept in a main document flow.

Figure 4A:
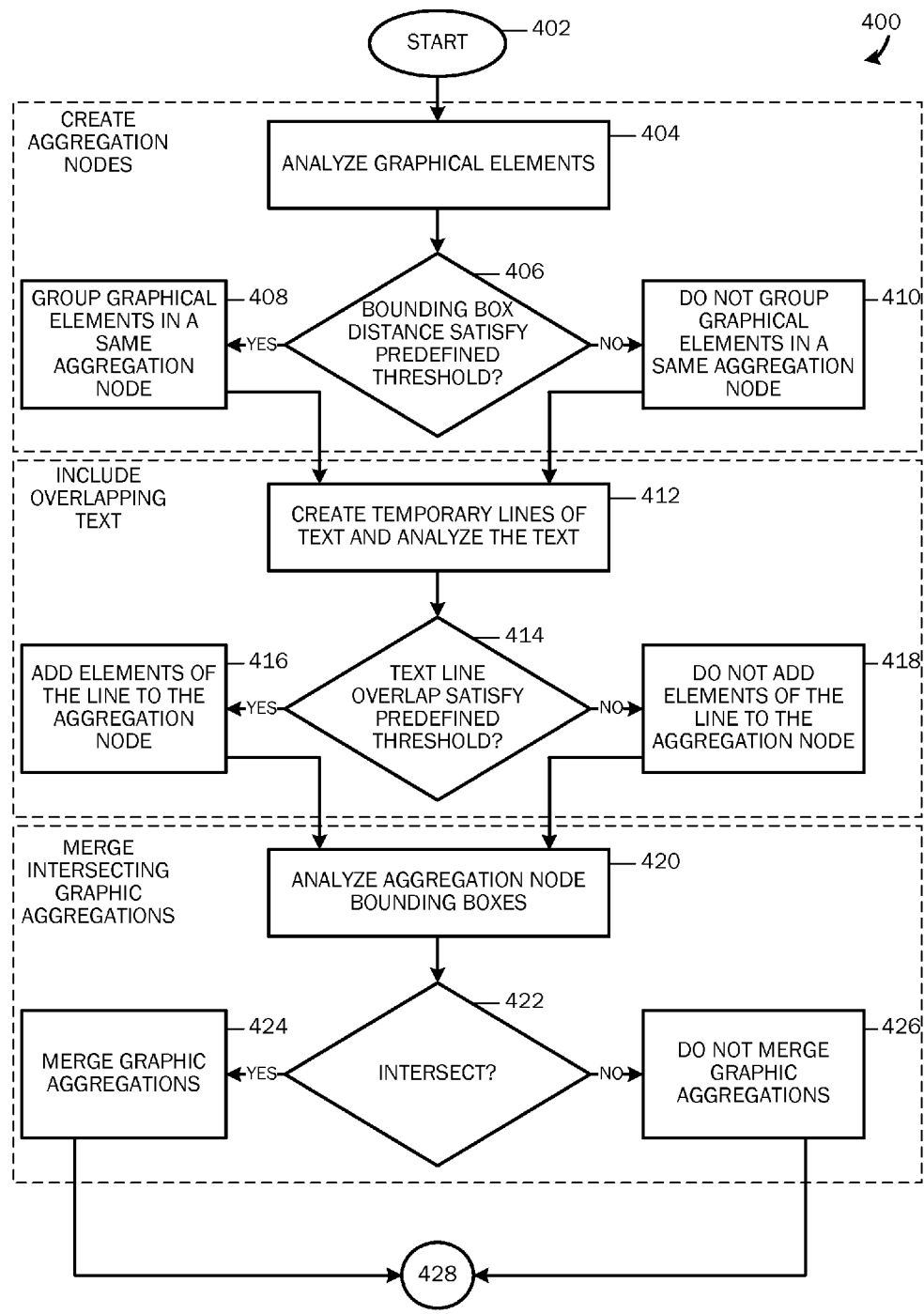
FIGS. 4A and 4B are a flow chart of a method for detection and grouping of graphic elements in a fixed format document.
Figure 4B:
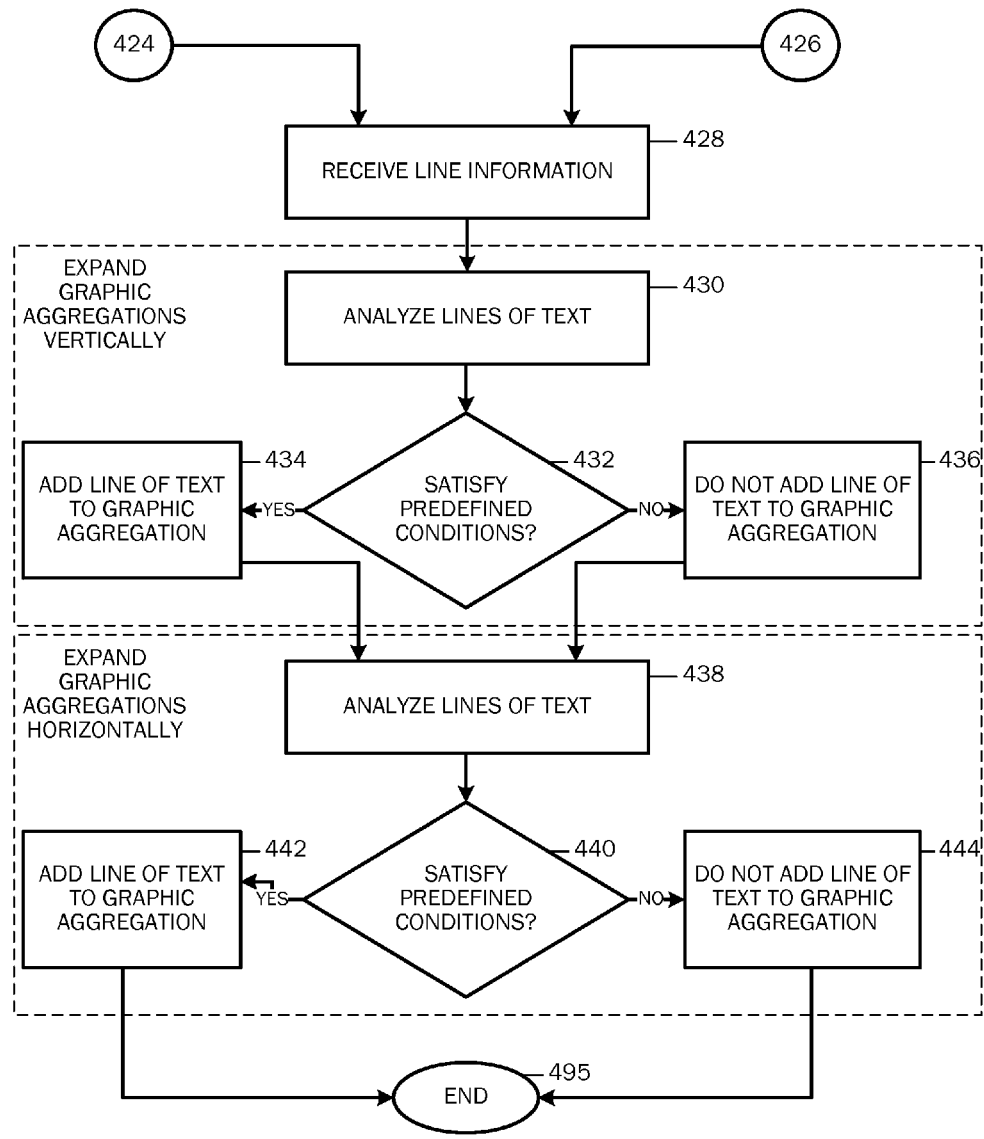

FIG. 4 is a flow chart showing one embodiment of graphic aggregation 302 detection and reconstruction method 400 executed by a vector graphics classification engine 118. The method 400 starts at OPERATION 402 and proceeds to a first set of operations (404-410) where graphical elements 304 may be grouped based on bounding box 306 sizes and the proximity of the graphical elements 304 on a page. As is known in the art, a bounding box 306 may be a tightest invisible box surrounding a graphical object and defining its size. At OPERATION 404, each pair of graphical elements 304 may be analyzed to determine if a distance between the two graphical elements 304 satisfies a predefined threshold. The distance between two graphical elements 304 may be defined as the shortest distance between any two points lying on bounding boxes 306 of the two graphical elements 304. If the bounding boxes 306 overlap, the distance may be determined to be zero (0). A determination for whether two graphical elements 304 should be aggregated into a same aggregation node may include determining a distance threshold according to bounding box 306 characteristics of the two graphical elements 304. According to one embodiment, the characteristic of a graphical element 304 may be calculated according to the following equation:

characteristic(e)=C(e)=Max(e.BoundingBox.Width, e.BoundingBox.Height)

Figure 5:
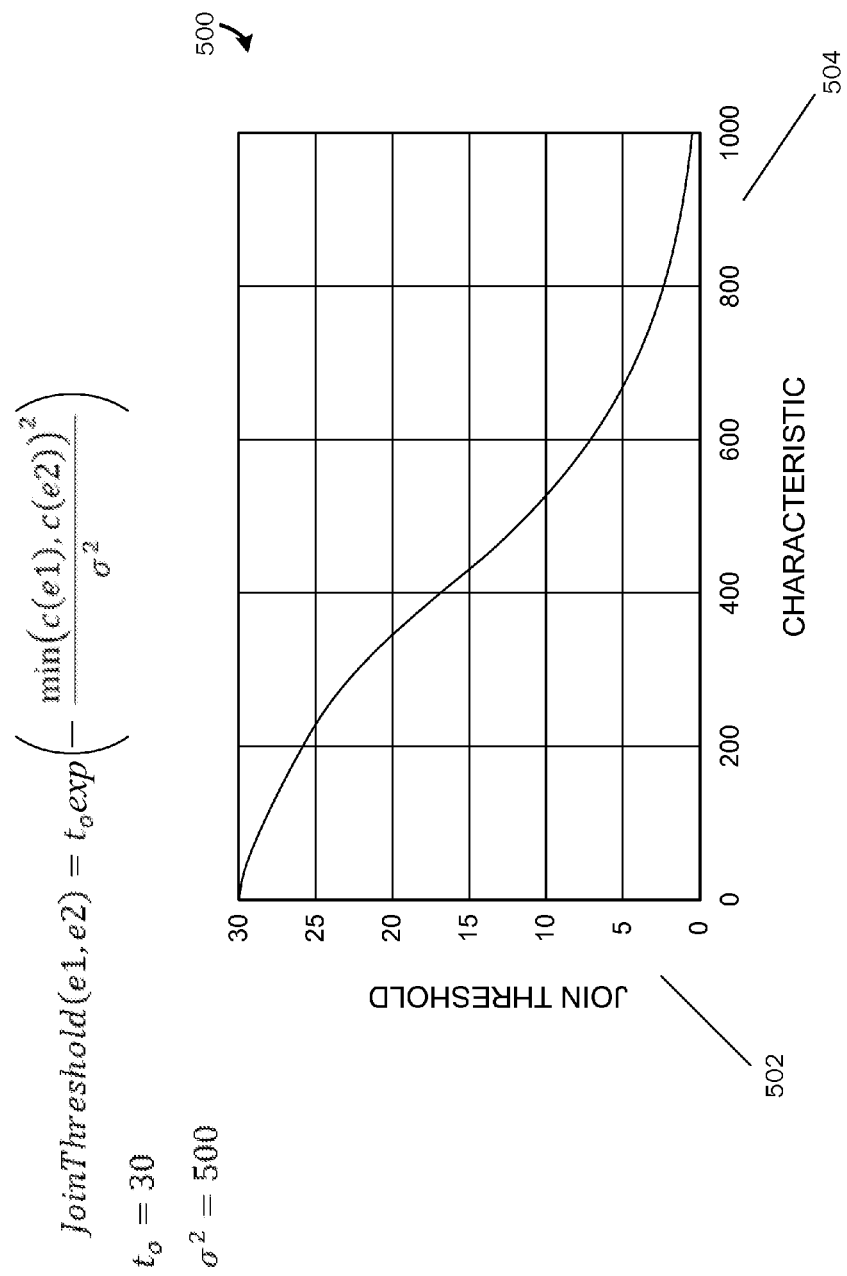
FIG. 5 is an illustration of a graph showing a relationship between join threshold values and characteristics of a graphical element.

According to an embodiment, the distance threshold may be defined as an exponential function (using an "exp" expression as is well known in the art) of the characteristic of a graphical element 304:

$$JoinThreshold\ (e1, e2) = t_o \exp\left(-\frac{\min(c(e1), c(e2))^2}{\sigma^2}\right)$$

where $t_o$ and $\sigma^2$ are parameters whose optimal values may be determined over a set of documents. With reference to FIG. 5, a graph 500 is illustrated showing join threshold values 502 depending on values of a characteristic 504 of a graphical element 304 with $t_o$=30 and $\sigma^2$=500.

The method 400 proceeds to DECISION OPERATION 406 where a determination is made whether the bounding box 306 distance satisfies a predefined join threshold value 502. According to an embodiment, the following equation may be utilized to determine whether two graphical elements 304 may be aggregated together:
if BoundingBoxDistance(e1,e2)<JoinThreshold(min{C(e1),C(e2)})

then
graphical elements should be in a same aggregation node. That is, if the calculated join threshold value 502 is greater than the shortest distance between any two points lying on bounding boxes 306 of the two graphical elements 304, then at OPERATION 408, the graphical elements 304 may be aggregated together in a same aggregation node. If the calculated join threshold value 502 is not greater than the shortest distance between any two points lying on bounding boxes 306 of the two graphical elements 304, then at the method 400 proceeds to OPERATION 410 where the two graphical elements 304 may be kept separately and grouped into separate graphic aggregations 302. OPERATIONS 404-410 may include analyzing graphical elements 304 without reflowable text (e.g., paths, images, rotated text runs, etc).

The method 400 may proceed to a next set of operations (412-418) where overlapping text (e.g., text elements falling within a bounding box 306 of a graphic aggregation 302 created at OPERATION 408) may be included in the graphic aggregation 302. At OPERATION 412, temporary lines of text may be created and analyzed. At DECISION OPERATION 414, a determination may be made whether a line of text should be included in a graphic aggregation 302 or if the text may be left as document flow text. According to an embodiment, if at least half of a line's width is inside a bounding box 306 of a graphic aggregation 302, at OPERATION 416, all elements of the line may be included in the graphic aggregation node. If at DECISION OPERATION 414 a determination is made that at least half of a line's width is not inside a bounding box 306 of a graphic aggregation 302, at OPERATION 418, the graphical elements 304 of the line may not be included in the graphic aggregation node.

The method 400 may proceed to a next set of operations (420-426) where intersecting graphic aggregations 302 may be merged. At OPERATION 420, graphic aggregation node bounding boxes 306 may be analyzed. At DECISION OPERATION 422, a determination may be made to determine if any two graphic aggregations 302 on a page intersect. If two graphic aggregations 302 intersect or overlap, at OPERATION 242, the two graphic aggregations 302 may be joined. According to an embodiment, the graphical elements 304 of the graphic aggregation 302 containing few graphical elements 304 may be moved to the graphic aggregation 302 containing more graphical elements 304. If at DECISION OPERATION 422 a determination is made that the two graphic aggregations 302 do not intersect or overlap, at OPERATION 426, the two graphic aggregations 302 may not be merged.

Figure 6:
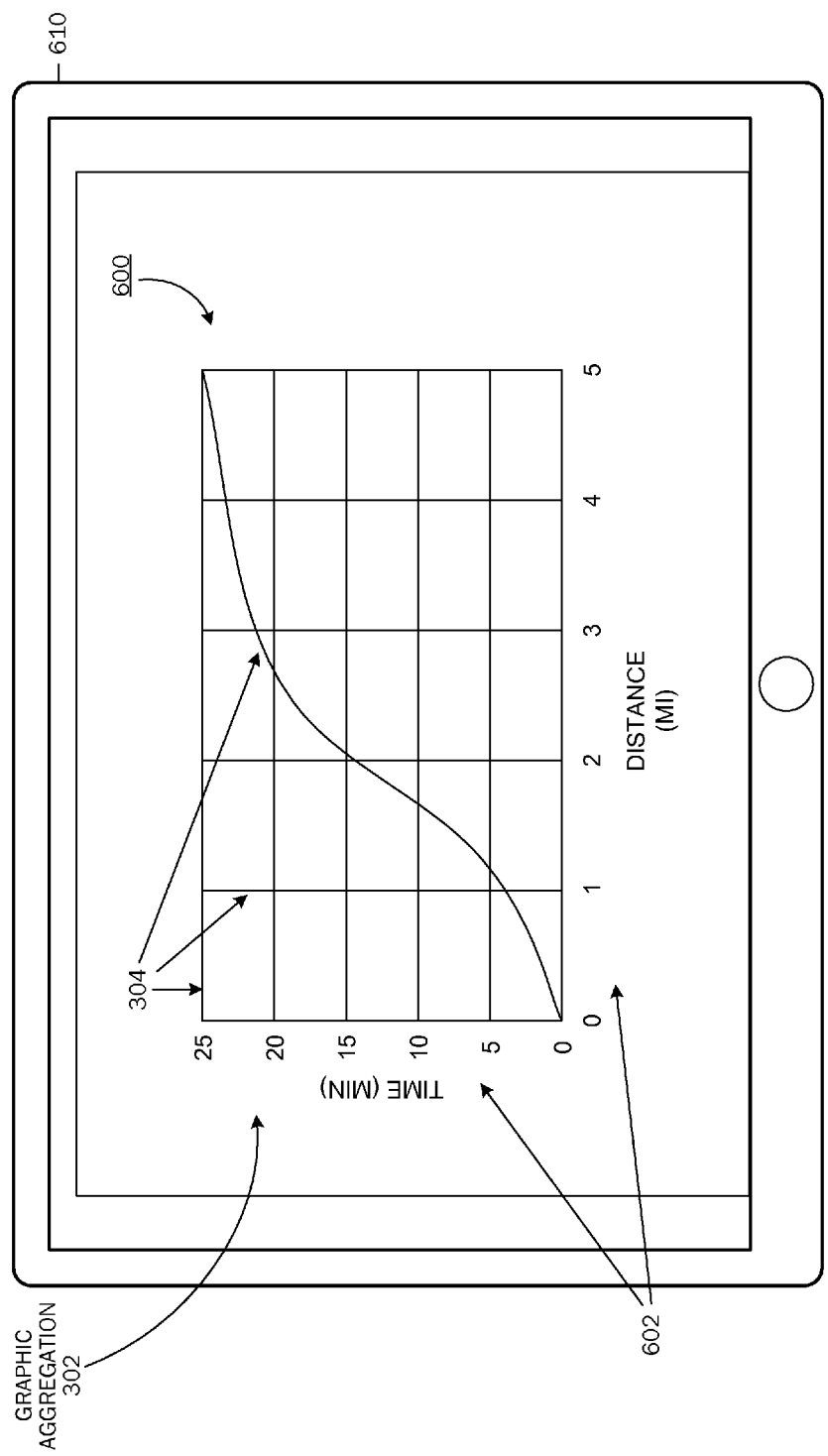
FIG. 6 is an illustration of a text run that does not overlap with a graphic aggregation but semantically belongs with the graphical elements of the graphic aggregation.

The method 400 may proceed to OPERATION 428, where information about lines may be received. According to embodiments, a layout analysis engine may be utilized to detect regions and lines of text in the regions. After lines are detected, the method 400 may proceed to a next set of operations where graphic aggregations 302 may be expanded vertically (OPERATIONS 430-436) and horizontally (OPERATIONS 438-444). OPERATIONS 430-444 may be utilized to aggregate lines in, for example, a graph 600 with a legend and/or coordinates 602 to a side of the graph and/or below the graph as illustrated in a fixed format document 106 displayed on a tablet computing device 610 in FIG. 6. A coordinate 602, for example, may be a text run that does not overlap with a graphic aggregation 302 but may semantically belong with the graphical elements 304 of the graphic aggregation 302.

At OPERATION 430, lines of text above and below a graphic aggregation 302 may be analyzed. At DECISION OPERATION 432, a determination may be made whether a line of text satisfies predefined conditions. According to an embodiment, predefined conditions may comprise:

abs(line.BoundingBox.Left−agg.BoundingBox.Left)
<⅕*agg.BoundingBox.Width abs(agg.BoundingBox.Rt−line.BoundingBox.Rt)
<⅕*agg.BoundingBox.Width vertical distance between line and aggregation<avg line height on page That is, if the text line does not extend on the left side or the right side from the graphic aggregation bounding box 306 more than one-fifth the width of the graphic aggregation bounding box 306, and if the vertical distance between the text line and the bounding box 306 of the graphic aggregation 302 is less than the average text line height on the page, at OPERATION 434, the graphic aggregation 302 may be expanded to include the text line. If the predefined conditions are not satisfied, the text line may not be added to the graphic aggregation 302 at OPERATION 436.

At OPERATION 438, lines of text to the left and right of a graphic aggregation 302 may be analyzed. At DECISION OPERATION 440, a determination may be made whether a line of text satisfies predefined conditions. According to an embodiment, predefined conditions may comprise:
text line has vertical overlap with the bounding box 306 of the graphic aggregation 302 left side of the text line on the left side of the bounding box 306 of the graphic aggregation 302 is at a distance of less than half of the width of the graphic aggregation bounding box 306 right side of the text line on the right side of the bounding box 306 of the graphic aggregation 302 is at a distance of less than half of the width of the graphic aggregation bounding box 306.

If the predefined conditions are satisfied, the text line may be added to the graphic aggregation 302 at OPERATION 442. Else, if the predefined conditions are not satisfied, at OPERATION 444, the text line may not be added to the graphic aggregation 302. The method 400 ends at OPERATION 495.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet 610 or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
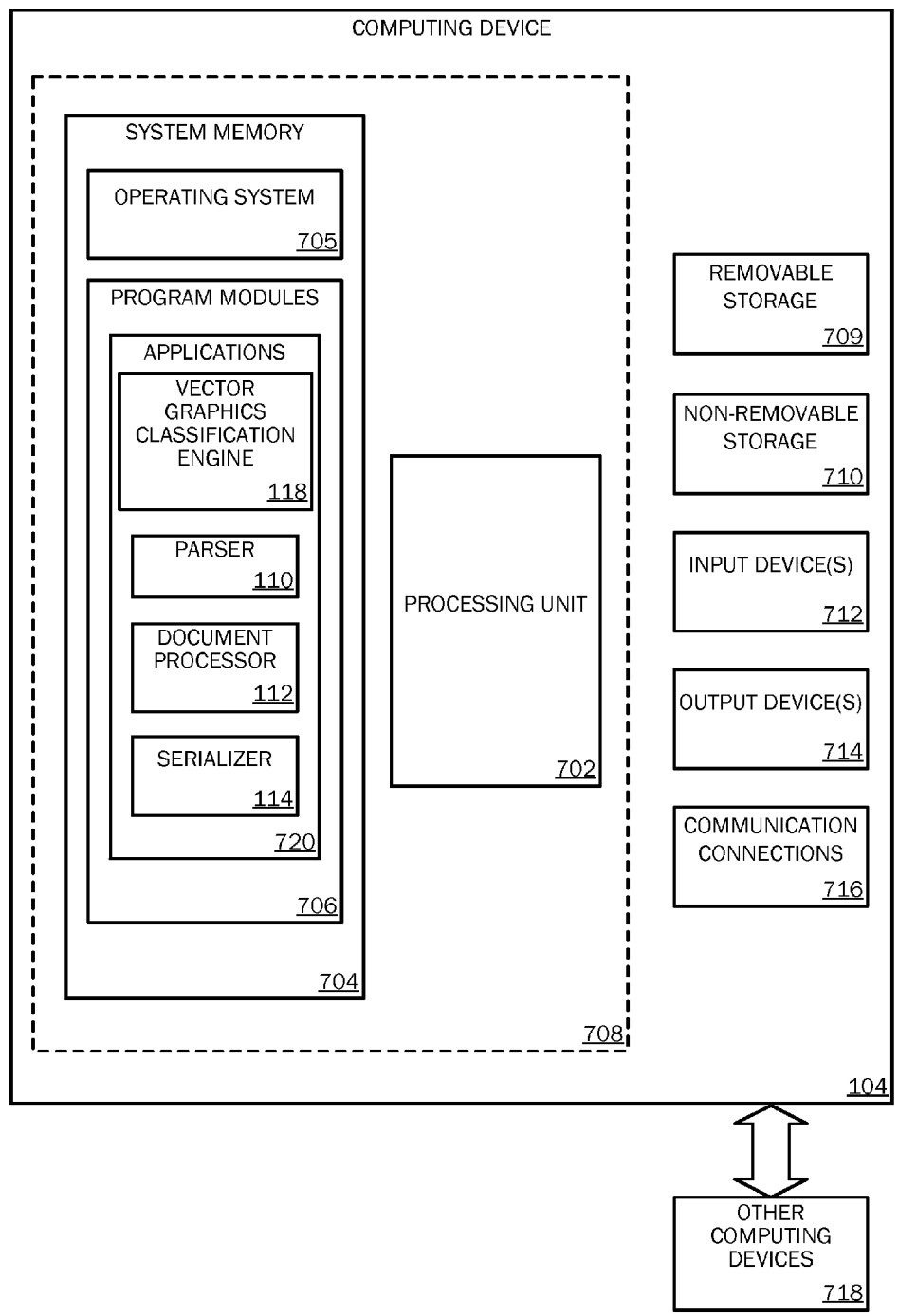
FIG. 7 is a block diagram illustrating example physical components of a computing device with which embodiments of the invention may be practiced.
Figure 8A:
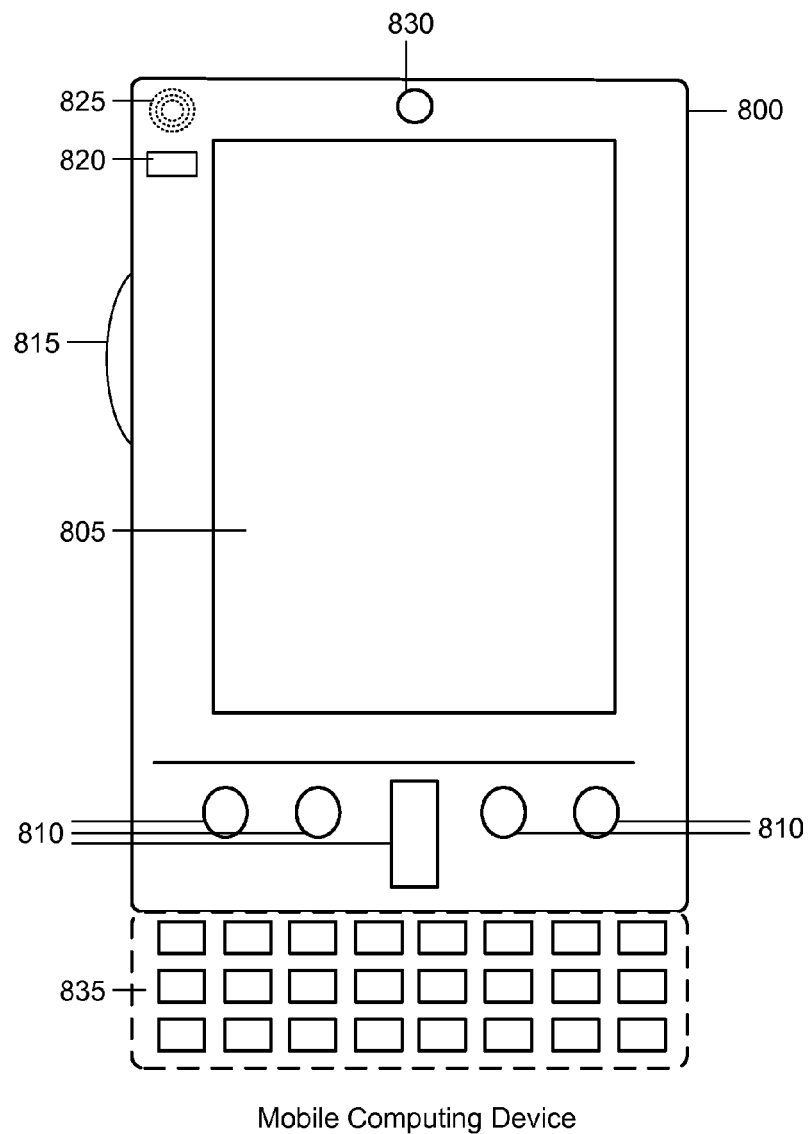
FIGS. 8A and 8B are simplified block diagrams of a mobile computing device with which embodiments of the present invention may be practiced.
Figure 8B:
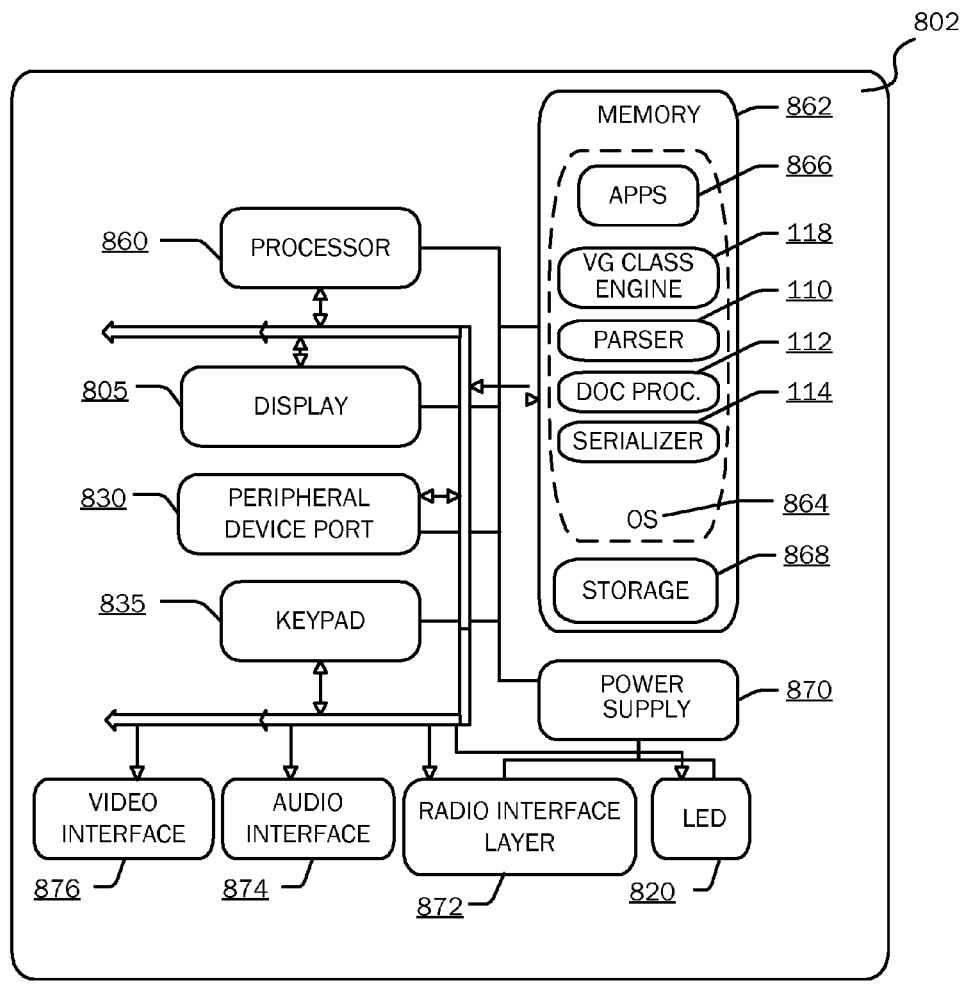
Figure 9:
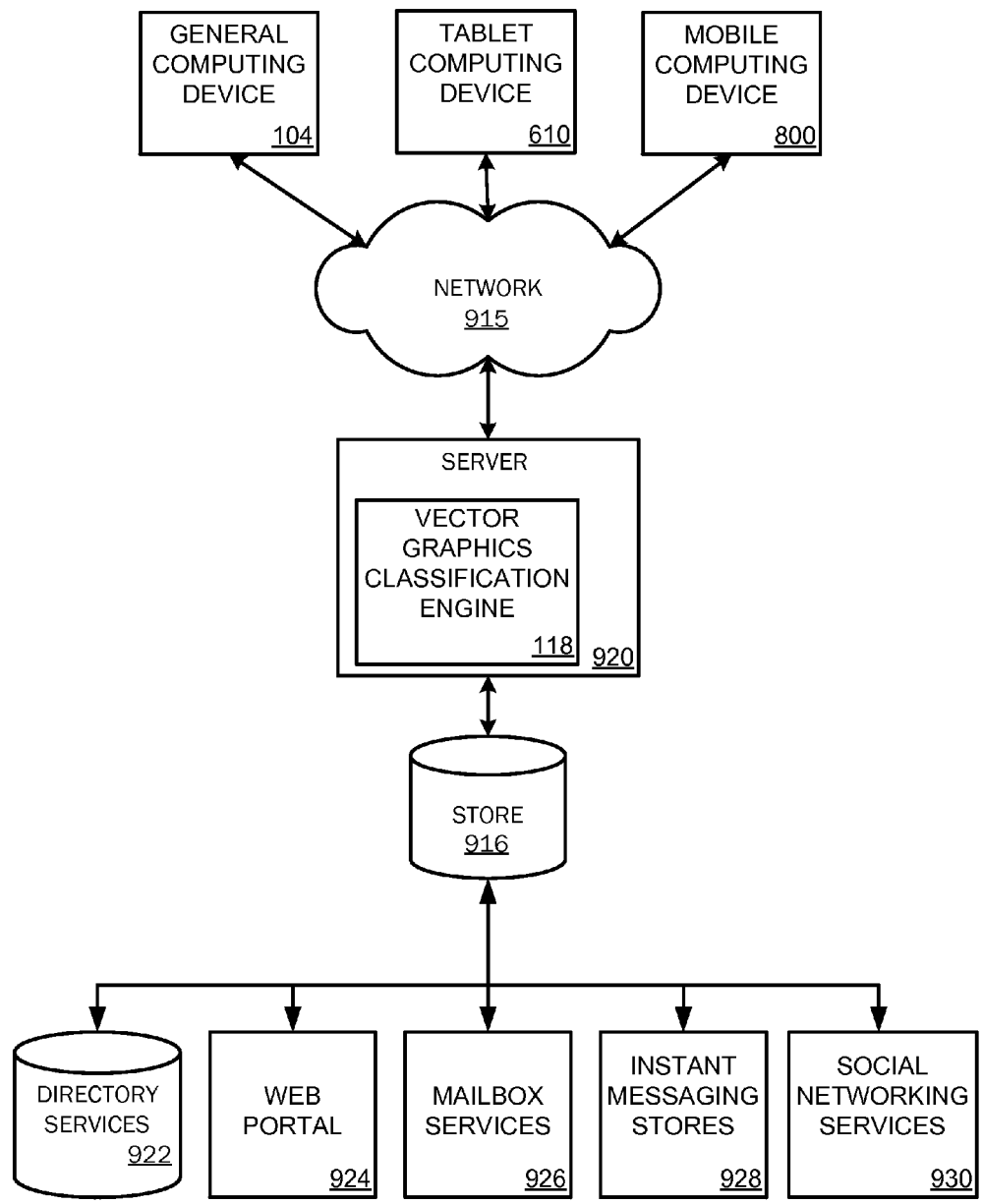
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 104 with which embodiments of the invention may be practiced. The computing device components described below may be suitable for the computing devices described above. In a basic configuration, the computing device 104 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the vector graphics classification engine 118, the document processor 112, the parser 110, the document converter 102, and the serializer 114. The operating system 705, for example, may be suitable for controlling the operation of the computing device 104. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 104 may have additional features or functionality. For example, the computing device 104 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., the vector graphics classification engine 118, the parser 110, the document processor 112, and the serializer 114) may perform processes including, but not limited to, one or more of the stages of the method 400 illustrated in FIG. 4. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the vector graphics classification engine 118, the parser 110, the document processor 112, and the serializer 114 may be operated via application-specific logic integrated with other components of the computing device 104 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 104 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 104 may include one or more communication connections 716 allowing communications with other computing devices 718. Examples of suitable communication connections 716 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 704, the removable storage device 709, and the non-removable storage device 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 104. Any such computer storage media may be part of the computing device 104.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer 610, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the vector graphics classification engine 118, the parser 110, the document processor 112, and the serializer 114 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The radio 872 allows the system 802 to communicate with other computing devices, such as over a network. The radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 802 provides notifications using the visual indicator 820 that can be used to provide visual notifications and/or an audio interface 874 producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868. Computer storage media may include volatile and nonvolatile, removable and non-removable media implemented in any method or technology for storage of information, such as computer readable instructions, data structures, program modules, or other data.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing detection and grouping of graphic elements in a fixed format document 106 to one or more client devices, as described above. Content developed, interacted with, or edited in association with the vector graphics classification engine 118, the parser 110, the document processor 112, and the serializer 114 may be stored in different communication channels or other storage types. For example, various documents may be stored using a directory service 922, a web portal 924, a mailbox service 926, an instant messaging store 928, or a social networking site 930. The vector graphics classification engine 118, the parser 110, the document processor 112, and the serializer 114 may use any of these types of systems or the like for enabling data utilization, as described herein. A server 920 may provide the vector graphics classification engine 118, the parser 110, the document processor 112, and the serializer 114 to clients. As one example, the server 920 may be a web server providing the vector graphics classification engine 118, the parser 110, the document processor 112, and the serializer 114 over the web. The server 920 may provide the vector graphics classification engine 118, the parser 110, the document processor 112, and the serializer 114 over the web to clients through a network 915. By way of example, the client computing device may be implemented as the computing device 104 and embodied in a personal computer, a tablet computing device 610 and/or a mobile computing device 800 (e.g., a smart phone). Any of these embodiments of the client computing device 104, 610, 800 may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for converting a fixed format document containing a plurality of graphical elements and a plurality of text lines into a flow format document, the method comprising:

detecting a plurality of graphical elements on a page in a fixed format document;

determining that a first graphical element is proximate to a second graphical element;

grouping the first graphical element and the second graphical element on the page as a first graphic aggregation in the flow format document, wherein a bounding box is defined about the first graphic aggregation;

vertically expanding the bounding box to include a first line of text on the page when:
- the first line of text is located above or below the bounding box,
- the first line of text does not extend beyond a left or a right side of the bounding box more than a first fraction of the width of the bounding box, and
- a vertical distance between the first line of text and the top or the bottom of the bounding box is less than an average text line height on the page; and horizontally expanding the bounding box to include a second line of text on the page when:
- the second line of text is located to the right or the left of the bounding box, and
- the second line of text is at a distance of less than a second fraction, the second fraction greater than the first fraction, of the width of the bounding box from the left or right side of the bounding box.

2. The method of claim 1, wherein the plurality of graphical elements comprise a path, an image, and text.

3. The method of claim 1, wherein determining that a first graphical element is proximate to a second graphical element further comprises:
determining a shortest distance between the first graphical element and the second graphical element; and
determining the shortest distance between the first graphical element and the second graphical element is less than a determined join threshold.

4. The method of claim 3, wherein determining a shortest distance between a first graphical element and a second graphical element comprises determining a shortest distance between a bounding box of the first graphical element and a bounding box of the second graphical element.

5. The method of claim 1, wherein the plurality of graphical elements comprise components of a flow chart, including a path, an image, and text.

6. The method of claim 1, wherein the second fraction is greater than first fraction.

7. The method of claim 6, wherein the first fraction comprises one-fifth.

8. The method of claim 7, wherein the second fraction comprises one-half.

9. The method of claim 1, further comprising expanding the bounding box to include a third line of text on the page when the third line of text overlaps the bounding box.

10. The method of claim 9, further comprising expanding the bounding box to include a fourth line of text on the page when the fourth line of text fails to overlap the bounding box but semantically belongs with the first graphic aggregation.

11. The method of claim 1, wherein the bounding box comprises a first bounding box, and wherein the method further comprises:
defining a second graphic aggregation on the page, wherein a second bounding box is defined around the second graphic aggregation; and
merging the second graphic aggregation with the first aggregation when the second graphic aggregation overlaps the first graphic aggregation.

12. A system for converting a fixed format document containing a plurality of graphical elements into a flow format document, the system comprising:
one or more processors; and
a memory coupled to the one or more processors, the one or more processors operable to:
detect a plurality of graphical elements on a page in a fixed format document;
determine that a first graphical element is proximate to a second graphical element;
group display the first graphical element and the second graphical element on the page as a first graphic aggregation in the flow format document and define a bounding box about the first graphic aggregation;
vertically expand the bounding box to include a first line of text on the page when:
- the first line of text is located above or below the bounding box,
- the first line of text does not extend beyond a left or a right side of the bounding box more than a first fraction of the width of the bounding box, and
- a vertical distance between the first line of text and the top or the bottom of the bounding box is less than an average text line height on the page; and
horizontally expand the bounding box to include a second line of text on the page when:
- the second line of text is located to the right or the left of the bounding box, and
- the second line of text is at a distance of less than a second fraction of the width of the bounding box from the left or right side of the bounding box.

13. The system of claim 12, wherein the plurality of graphical elements comprise a path, an image, and text.

14. The system of claim 12, wherein in determining that a first graphical element is proximate to a second graphical element, the one or more processors are further operable to:
determine a shortest distance between the first graphical element and the second graphical element; and
determine the shortest distance between the first graphical element and the second graphical element is less than a determined join threshold.

15. The system of claim 14, wherein in determining a shortest distance between a first graphical element and a second graphical element, the one or more processors are operable to determine a shortest distance between a bounding box of the first graphical element and a bounding box of the second graphical element.

16. The system of claim 12, wherein the one or more processors are further operable to:
determine that the first graphic aggregation and a second graphic aggregation intersect; and
merge the first graphic aggregation and the second graphic aggregation into a single aggregation.

17. A computer readable storage device containing computer executable instructions which, when executed by a computer, perform a method for converting a fixed format document containing a plurality of graphical elements into a flow format document, the method comprising:
detecting a plurality of graphical elements on a page in a fixed format document;
determining that a first graphical element is proximate to a second graphical element; and
grouping the first graphical element and the second graphical element on the page as a first graphic aggregation in the flow format document, wherein a bounding box is defined about the first graphic aggregation;

vertically expanding the bounding box to include a first line of text on the page when:
the first line of text is located above or below the bounding box,
the first line of text does not extend beyond a left or a right side of the bounding box more than a first fraction of the width of the bounding box, and
a vertical distance between the first line of text and the top or the bottom of the bounding box is less than an average text line height on the page; and
horizontally expanding the bounding box to include a second line of text on the page when:
the second line of text is located to the right or the left of the bounding box, and
the second line of text is at a distance of less than a second fraction of the width of the bounding box from the left or right side of the bounding box.

* * * * *